United States Patent [19]

McKenzie et al.

[11] 4,398,739
[45] Aug. 16, 1983

[54] SPLASH GUARD

[75] Inventors: Ross A. McKenzie, Toronto; Hans Busch, Mississauga, both of Canada

[73] Assignee: National Rubber Company, Limited, Toronto, Canada

[21] Appl. No.: 205,290

[22] Filed: Nov. 10, 1980

[51] Int. Cl.³ .............................................. B62D 25/16
[52] U.S. Cl. ............................ 280/154.5 R; 428/167; 428/288
[58] Field of Search ................ 280/154.5 R, 154.5 A, 280/155, 156, 157; 428/167, 288

[56] References Cited

U.S. PATENT DOCUMENTS

| | | | |
|---|---|---|---|
| 2,683,612 | 7/1954 | Bacino | 280/154.5 R |
| 2,714,015 | 7/1955 | Sherman | 280/154.5 R |
| 3,027,178 | 3/1962 | Eaves | 280/154.5 R |
| 3,088,751 | 5/1963 | Barry et al. | 280/154.5 R |
| 3,089,712 | 5/1963 | Kosik, Jr. | 280/154.5 R |
| 3,116,072 | 12/1963 | Robb et al. | 280/154.5 R |
| 3,285,624 | 11/1966 | Aber et al. | 280/154.5 R |
| 3,350,114 | 10/1967 | Salisbury | 280/154.5 R |
| 3,497,238 | 2/1970 | Carlton | 280/154.5 R |
| 3,521,903 | 7/1970 | Rister | 280/154.5 R |
| 3,549,171 | 12/1970 | Katz | 280/154.5 R |
| 3,713,669 | 1/1973 | Evans | 280/154.5 R |
| 3,791,912 | 2/1974 | Allard | 161/160 |
| 3,863,949 | 2/1975 | Clarke | 280/156 |
| 3,899,192 | 8/1975 | Reddaway | 280/154.5 R |
| 3,901,533 | 8/1975 | Kosik, Jr. et al. | 280/154.5 R |
| 3,929,352 | 12/1975 | Arenhold | 280/154.5 R |
| 3,953,053 | 4/1976 | Arenhold | 280/154.5 R |
| 4,029,037 | 6/1977 | Hogan | 114/127 |
| 4,258,929 | 3/1981 | Brandon | 280/154.5 R |

FOREIGN PATENT DOCUMENTS 1101143 1/1968 United Kingdom ......... 280/154.5 R

Primary Examiner—Joseph F. Peters, Jr.
Assistant Examiner—Michael Mar
Attorney, Agent, or Firm—Ridout & Maybee

[57] ABSTRACT

A splash guard to be suspended adjacent a vehicle wheel to reduce splash of liquid and slush comprises a sheet having a splash receiving surface covered with a plurality of spaced apart, discrete, elongated, stiff protuberances that are arranged in a pattern defining downward flow paths along the sheet and that direct liquid and slush thrown from the wheel into the flow paths, from which the liquid and slush can drain from the sheet. The sheet is reinforced by downwardly extending ribs which also impede sideward splashing. The protuberances and ribs are integral with the sheet. The sheet of elastomeric material is reinforced adjacent the splash receiving surface by embedded threads. The ribs are reinforced adjacent their free edges by embedded threads. The reinforcing threads resist excessive convex bending of the sheet. A guard of similar structure can be attached to the underside of a vehicle above the wheel.

11 Claims, 4 Drawing Figures

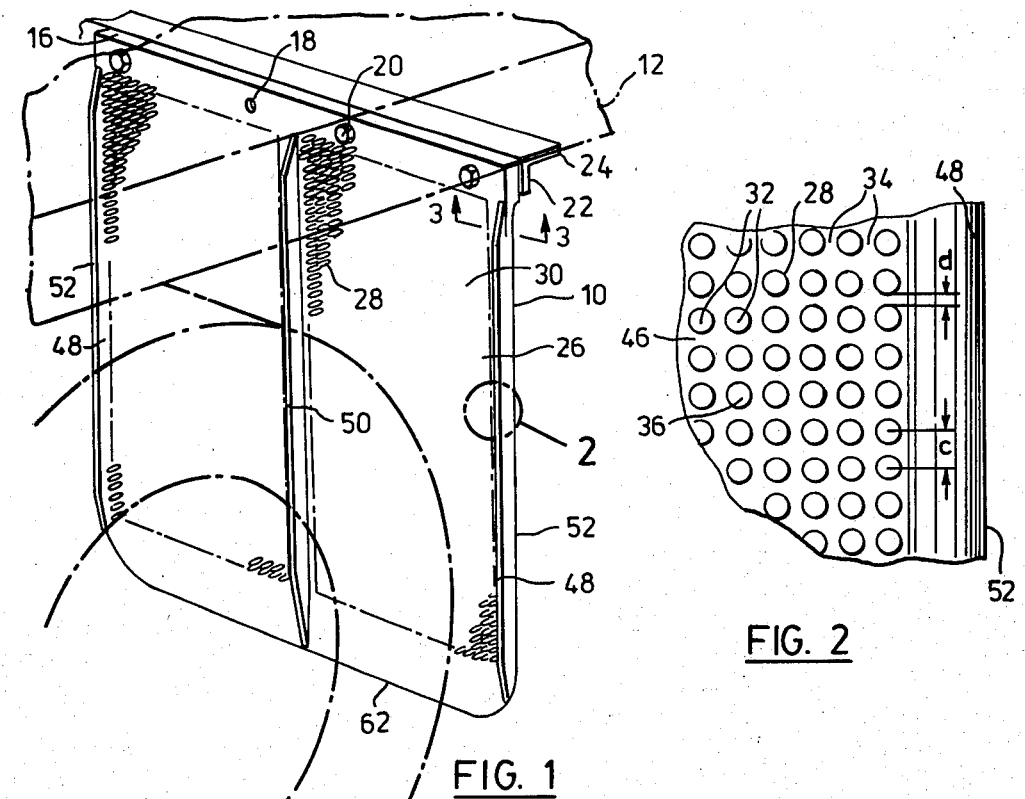
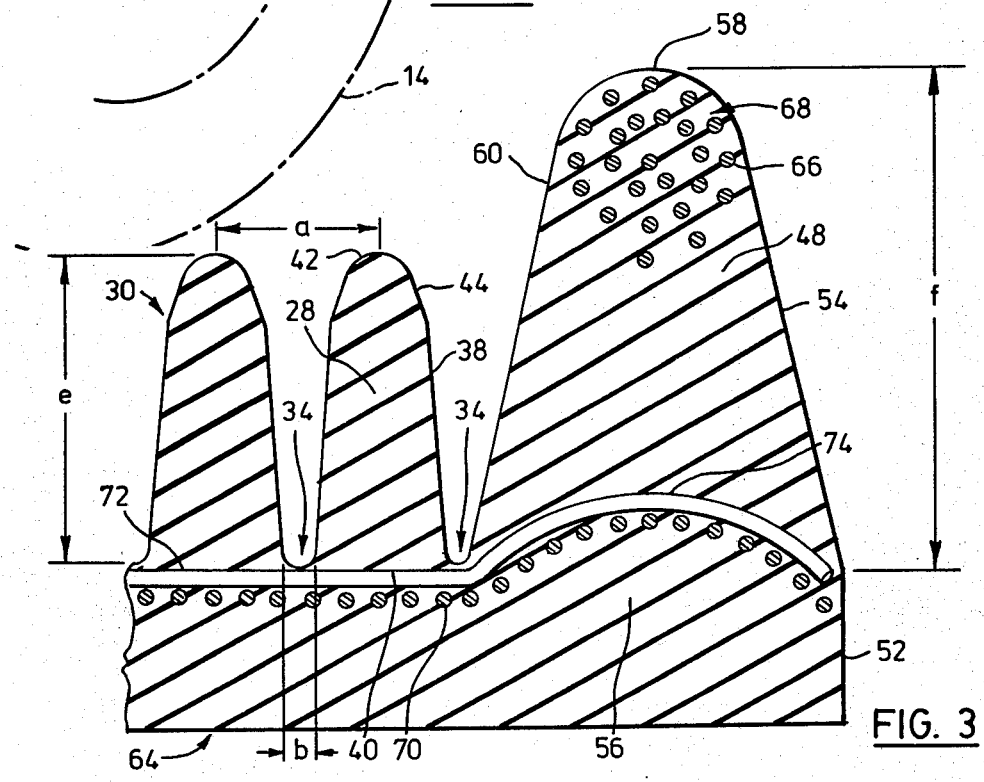
FIG. 1
FIG. 2
FIG. 3

SPLASH GUARD

FIELD OF THE INVENTION

This invention relates to a splash guard for reducing the splash and spray of liquid and slush from the wheels of a moving vehicle.

DESCRIPTION OF THE PRIOR ART

As the wheels of a vehicle travel on a wet surface, their rotation causes them to throw ice, snow, mud or other liquids or slush from the underlying roadway. When this liquid and slush is thrown against a solid surface on, or appended to, the vehicle, the liquid and slush can be deflected outwardly as spray. The spray can be caught by the turbulent air surrounding the wheel and thrown in various directions to produce annoying or dangerous conditions.

Various devices have been proposed in an attempt to reduce such splash and spray. Special fenders and steel skirts merely provide other solid surfaces against which the liquid and slush may be thrown and may interfere with the installation and removal of tires. Conventional mudflaps which hang behind the wheels of a vehicle and have a hard planar surface are also unsatisfactory because they only provide another surface from which the liquid and slush can be deflected outwardly. Splash guards which merely use baffles, vertical or otherwise, also deflect a substantial amount of liquid and slush outwardly as spray.

The splash guard illustrated in U.S. Pat. No. 3,899,192, issued Aug. 12, 1975 to W. W. Reddaway, catches liquid and slush thrown from the wheels for draining from the bottom of the splash guard. However, the random, angular, crossing relationship of the elongate blade elements impedes the entry of the liquid and slush into the vertical channels for draining.

Another difficulty with splash guards is the problem of "sailing", i.e., the tendency to swing or flap rearwardly upon forward movement of the vehicle, thereby uncovering part of the wheels and allowing liquid and slush to be thrown rearwardly without obstruction.

Various means have been proposed in an attempt to counteract the tendency of a splash guard to sail. These means include rigid external devices affixed to the splash guard to limit rearward movement of the splash guard, rigid backing materials attached to the splash guard, and rigid stiffening members inserted into cavities formed by rolling the splash guard. However, when a vehicle such as a truck backs up to a loading dock in such a manner as to cause the device to be squeezed between the dock and the wheels of the truck, it is preferable to have a splash guard which is made of a sufficiently flexible material in order to avoid being cracked or broken.

Other means proposed to solve the problem of sailing include ribbed constructions and embedded rigid reinforcement. It is preferable to reinforce the ribbed constructions for greater rigidity against sailing. The constructions utilizing embedded reinforcement have not located the reinforcements at a position within the splash guard to maximize the tensile strength.

SUMMARY OF THE INVENTION

According to the present invention there is provided a splash guard to be suspended adjacent a vehicle wheel to reduce splash of liquid and slush comprising a sheet having a splash receiving surface covered with a plurality of spaced apart, discrete, elongated, stiff protuberances that are arranged in a pattern defining downward flow paths along the sheet and that direct liquid and slush thrown from the wheel into the flow paths, from which the liquid and slush can drain from the sheet. The sheet is preferably elastomeric and reinforced by integral downwardly extending ribs which have embedded reinforcing threads adjacent their free edges to resist excessive convex flexing. The sheet is also reinforced adjacent the splash receiving surface by embedded threads.

There is also provided a splash guard comprising a sheet of elastomeric material reinforced by forwardly protruding ribs integral with said sheet, which ribs are internally reinforced adjacent their forward edges to resist excessive flexing of the sheet. There is further provided a splash guard comprising a sheet of elastomeric material internally reinforced adjacent its forward surface to resist excessive flexing.

Further, there is provided a splash guard to be attached to the underside of a vehicle adjacent a wheel to reduce splash of liquid and slush, comprising a sheet having a splash receiving surface covered with a plurality of spaced apart, discrete, elongated, stiff protuberances that are arranged in a pattern defining flow paths along the sheet and that direct liquid and slush thrown from the wheel into the flow paths, from which the liquid and slush can drain from the sheet.

BRIEF DESCRIPTION OF THE DRAWINGS

Preferred embodiments of the invention are illustrated in the drawings wherein:

FIG. 1 is a perspective view of a splash guard suspended below the body of a vehicle and rearwardly of a wheel of said vehicle;

FIG. 2 is an enlarged fragmentary front view of the splash guard of FIG. 1;

FIG. 3 is an enlarged section taken along the line 3—3 of FIG. 1; and

DESCRIPTION OF THE PREFERRED EMBODIMENT

Figure 4:
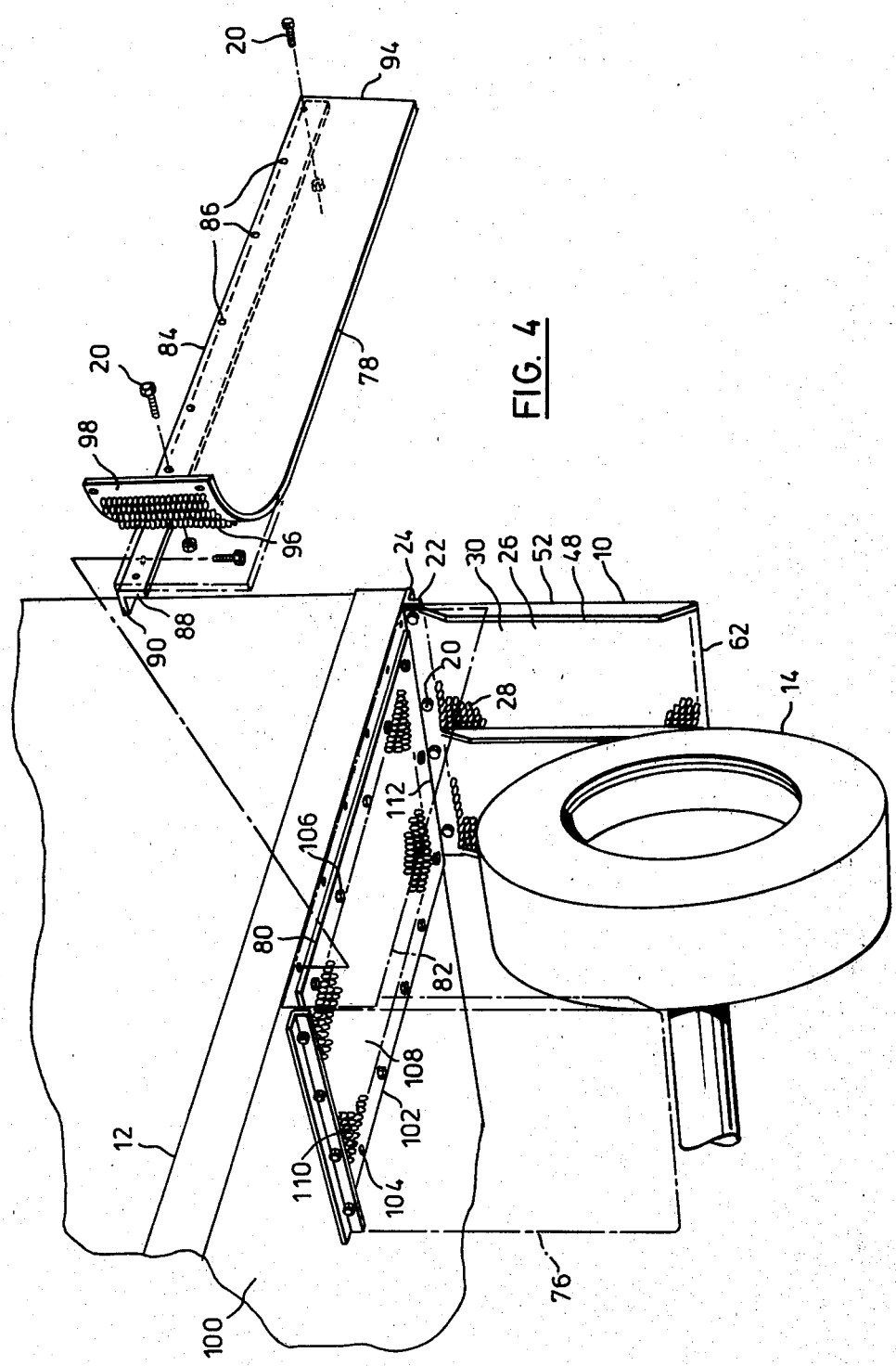
FIG. 4 is a partially exploded perspective view of the underside of a vehicle showing how splash guards can be mounted to the rear of, to the front of, above and outwardly of a wheel of said vehicle.

In FIG. 1, a splash guard 10 is shown suspended from the body of a vehicle 12 behind the wheel 14. As means for fastening it to the vehicle, the splash guard 10 has spaced apertures 18 adjacent the upper edge 16 of the splash guard 10. These fastening apertures 18 are adapted to receive therethrough suitable fasteners 20 for detachably connecting the splash guard 10 to the flange 22 of an angle bracket 24 secured to the vehicle.

The splash guard 10 is a substantially rectangular sheet 26. The sheet 26 is preferably made of an elastomeric material, for example, vulcanized rubber. Such a material enables the splash guard to flex when caught between the wheel 14 and another hard surface. A plurality of spaced apart, discrete, elongated, stiff nipples 28 is uniformly distributed over substantially the entire forward surface 30 of the sheet 26 and the nipples protrude forwardly therefrom. Preferably the nipples 28 are also made of elastomeric material integral with the sheet 26. Although the nipples 28 are of elastomeric material and can therefore flex to some extent, their stiffness is sufficient to ensure that they maintain their individual discreteness.

Referring to FIG. 2, the nipples 28 are disposed in vertically apart spaced rows 32 in such a fashion as to define vertical flow channels 34 for liquid and slush between said vertically spaced rows 32. The center-to-center spacing "a" (FIG. 3) between adjacent vertical rows 32 of nipples 28 is about 1/5 to 1 inch, with the open distance "b" (FIG. 3) between adjacent vertical rows 32 about 1/100 to 3/4 inch. The center-to-center spacing "c" (FIG. 2) between adjacent horizontal rows 36 of nipples 28 is about 1/5 to 1 inch, with the lateral open distance "d" (FIG. 2) between adjacent horizontal rows 36 about 1/100 to 1 inch. The height "e" (FIG. 3) of nipples 28 is about 1/4 to 1 inch. The density of the nipples 28 on the surface 30 is in the range of 144 to 3600 nipples per square foot. These dimensions and densities are of a range that allows sufficient space between the nipples 28 for the entry and flow of liquid and slush in the vertical flow channels 34 without presenting sheet surfaces adjacent the roots 40 of the nipples 28 that are sufficiently unimpeded by adjacent nipples 28 that the liquid and slush can freely be deflected sideways of the splash guard 10. The dimensions and densities suggested are also of a range which does not present a forward surface at the tips of the nipples 28 with mere crevices between the nipples, which forward surface would also outwardly deflect the liquid and slush.

As shown in FIG. 3, the nipples 28 are preferably progressively tapered forwardly as at 38 from their root ends 40 towards their tips 42. The angle of taper changes at 44 towards the tips 42 and finally the shape becomes substantially semi-elliptical at the tips 42. The tips 42 of the nipples optimally present minimal surface area to the liquid and slush. The profile of the nipples 28, as viewed in FIG. 3, is preferably curvilinear at the tips but the tapering nipples 28 may also be conical or polygonal. In end view, as shown in FIG. 2, the nipples 28 are circular. Preferably, the nipples 28 are curvilinear in end view to provide a smooth flow pattern, but they may also be triangular or polygonal.

The liquid and slush which emanates from the wheel 14 is directed by the nipples into the recesses 34, 46 on the splash receiving surface 30 between the nipples 28 and drains down the vertical channels 34 defined by the spaced apart, vertical rows 32. This action hinders or prevents the liquid and slush from being atomized and picked up by turbulent air currents which might otherwise spray the liquid and slush out into the regions following and adjacent the vehicle. The liquid and slush draining down the vertical channels 34 also act as an impact absorbing medium to liquid and slush impinging thereon to further prevent atomization. A good portion of any splash that does deflect outwardly is further dissipated by the adjacent nipples 28.

A further advantage of the particular construction described herein is that the channels 34 of the splash guard 10 are easily cleaned of liquid, slush and other foreign material which might collect between the nipples 28. The splash guard 10 cleans itself by the spash of liquid thrown against it by the wheel 14, and by the draining of the liquid and slush down the sheet 10.

Longitudinal ribs 48, 50 project forwardly from the splash receiving surface 30 of the sheet 26 towards the vehicle wheel 14. These ribs 48, 50 are substantially vertical and parallel to the side edges 52 of the sheet 26. A rib 48 is provided along each side edge 52 of the sheet. A central rib 50 runs down the vertical center of the sheet 26. Preferably, the ribs 48, 50 are also made of an elastomeric material and are integral with the sheet 26.

As shown in FIG. 3, the height "f" of the ribs 48, 50 is substantially greater than the height "e" of the nipples 28. The height "f" of the ribs 48, 50 is about 3/8 to 1 1/4 inch. The ribs 48, 50 are progressively tapered at 54 from their roots 56 to their rounded tips 58. The tapered profile 54 of the ribs may alternatively be substantially conical or polygonal.

The side ribs 48 act as baffles by obstructing discharge of liquid and slush off the sheet 26 in a sideward direction. Sideward splash or flow can strike the inner side 60 of the side ribs 48 and be directed downwardly to drip from the splash guard 10 at the bottom 62 thereof.

A further function performed by the ribs 48, 50 is in rigidifying the splash guard 10 sufficiently that external anti-sailing devices need not be employed. The splash guard 10 can flex slightly so that the splash receiving surface 30 may take on a slightly convex form and the reverse face 64 may take on a slightly concave form rather than swinging or flapping rearwardly upon movement of the vehicle. The cleaning function of the splash guard 10 is further aided by this slight flexion.

To further perform this anti-sail function, the ribs are internally reinforced by linear reinforcements 66 running longitudinally within the ribs 48, 50. The reinforcements 66 are embedded within the ribs 48, 50 adjacent the tips 58 of the ribs 48, 50. Preferred reinforcements are threads of metallic or organic material such as tire cord. The configurations of the reinforcements may vary. FIG. 3 illustrates a helical arrangement 68.

The sheet 26 itself is also reinforced to further satisfy the anti-sail function. The reinforcements 70 are embedded within the sheet adjacent the roots 40 of the nipples 28 and the roots 56 of the ribs 48, 50, i.e., adjacent the splash receiving surface 30 of the sheet 26. This provides additional hindrance to sailing and greater strength in the tensile region on bending. Preferred reinforcements 70 are also threads of metallic or organic material such as tire cord.

Preferably the threads 70 run substantially parallel to one another down the sheet 26. They may be at random vertical lengths but should cover substantially the entire sheet 26 and be spaced over substantially the entire width of the sheet 26.

Adjacent the upper edge 16 of the splash guard 10, overlying said threads 70, is a further series of threads 72 running transversely to the threads 70, the threads 72 being in spaced and substantially parallel arrangement to one another. These threads 72 run substantially the horizontal width of the sheet 26. These threads 72 are curved convexly forwardly at 74, adjacent the roots 56 of the ribs 48, 50. This reinforcement serves both as an anti-sailing force and as a means to prevent or reduce ripping or tearing of the sheet 26 in the area where it is fastened to the vehicle.

If desired, another splash guard 76 like the one 10 heretofore described can be mounted forwardly of the vehicle wheel 14 with its nipples 28 protruding rearwardly toward the wheel 14, as shown in FIG. 4 in broken lines.

Also, in FIG. 4, the rear splash guard 10 is shown in combination with a side splash guard 78 and an underside splash guard 80. The side splash guard 78 is shown in full lines removed from its broken line position 82 where it would be suspended from the body of the vehicle 12 outwardly of the wheel 14. Adjacent the upper edge 84 of the side splash guard 78 are spaced fastening apertures 86 adapted to receive therethrough fasteners 20 for detachably connecting the side splash guard 78 to the flange 88 of an angle bracket 90 secured to the vehicle.

The side splash guard 78 is a substantially rectangular sheet 94. Like the sheet 26, the sheet 94 is preferably made of an elastomeric material which enables the splash guard to flex when caught between the wheel 14 and another hard surface. A plurality of discreet nipples 96 is uniformly distributed over substantially the entire inward surface 98 of the sheet 94, protruding inwardly therefrom.

The nipples 96 are constructed, disposed, spaced and shaped as described hereinabove in relation to the splash guard 10. The side splash guard 78 functions in a similar manner, to direct the mixture of liquid and slush which emanates from the wheel 14, is caught in the recesses on the splash receiving surface 98 between the nipples 96, and flows down vertical channels defined by vertical rows of nipples 96.

The underside splash guard 80 is shown attached to the underside of the body 100 of the vehicle 12 above a wheel 14. The underside splash guard 80 is a substantially rectangular sheet 102 identical to the side splash guard 78 in all respects except that the fastening apertures 104 in the former 80 are spaced along the entire periphery of the underside splash guard 80. Fasteners 106 detachably attach the underside splash guard 80 to the underside of the body 100 of the vehicle 12.

Liquid and slush which emanates from the wheel 14 is caught in the recesses between the nipples 110 on the splash receiving surface 108 of the underside splash guard 80. As the vehicle moves in a forward direction the liquid and slush will flow toward the rear of the underside splash guard 80, along channels defined by the parallel rows of nipples 110, similar to the channels 34 of the splash guard 10. The liquid and slush can then drain downward from the rear edge 112 of the underside splash guard 80, the rear splash guard 10 preventing rearward spray thereof.

While specific embodiments of this invention have been disclosed and illustrated herein, it is to be understood that variations and modifications are possible without departing from the spirit of this invention.

We claim:

1. A splash guard to be suspended adjacent a vehicle wheel to reduce splash of liquid and slush therefrom, comprising:
   a sheet of flexible material having a splash receiving surface covered with spaced apart, discrete, elongated, stiff nipple-like protuberances arranged in downwardly extending rows to define downwardly extending flow paths between them along the sheet and open at their lower ends;
   downwardly extending stiffening ribs protruding from the surface adjacent opposite edges thereof, the protuberances and ribs being integral with the sheet and directing the liquid and slush into the downwardly extending flow paths to drain from the sheet, the flow paths being about 1/100 to $\frac{3}{4}$ inch wide, the protuberances about $\frac{1}{4}$ to 1 inch high and the ribs about $\frac{3}{8}$ to $1\frac{1}{4}$ inch high and higher than the protuberances;
   first reinforcement means in the form of a plurality of threads embedded within the sheet adjacent the splash receiving surface to resist excessive convex flexing of the sheet; and
   second reinforcement means in the form of a plurality of downwardly extending threads embedded within the ribs adjacent their free edges to resist excessive convex flexing of the ribs and the surface.

2. A splash guard as claimed in claim 1, wherein the protuberances are smooth surfaced.

3. A splash guard as claimed in claim 1, wherein the splash guard has means for attaching it to the underside of a vehicle adjacent a wheel.

4. In combination, a first splash guard as claimed in claim 3 together with a second splash guard to be attached adjacent to the underside of the vehicle adjacent the wheel to reduce splash of liquid and slush from the wheel, the second splash guard comprising a sheet of flexible material having a splash receiving surface covered with spaced apart, discrete, elongated, stiff nipple-like protuberences arranged in rows to define flow paths between them along the sheet and open at their ends.

5. A splash guard as claimed in claim 1, wherein the protuberances are uniformly distributed over the surface.

6. A splash guard as claimed in claim 5 wherein the surface density of the protuberances is about 144 to 3600 per square foot.

7. A splash guard as claimed in claim 5, wherein the rows are spaced about 1/5 to 1 inch apart.

8. A splash guard as claimed in claim 1, wherein the protuberances are in horizontal rows about 1/100 to 1 inch apart.

9. A splash guard as claimed in claim 1, wherein the sheet is of elastomeric material.

10. A splash guard as claimed in claim 1, wherein the ribs include a rib down the center of the sheet.

11. A splash guard to be suspended adjacent a vehicle wheel to reduce splash of liquid and slush therefrom, comprising:
    a sheet of elastomeric material having a splash receiving surface covered with spaced apart, discrete, elongated, stiff, smooth surfaced nipple-like protuberances uniformly distributed over the surface in a density of about 144 to 3600 per square foot and arranged in horizontal rows about 1/100 to 1 inch apart and in downwardly extending rows spaced about 1/5 to 1 inch apart to define downwardly extending flow paths between them along the sheet and open at their lower ends;
    downwardly extending stiffening ribs protruding from the surface adjacent opposite edges and the center thereof, the protuberances and ribs being integral with the sheet and directing the liquid into downwardly extending flow paths to drain from the sheet, the flow paths being about 1/100 to $\frac{3}{4}$ inch wide, the protuberances about $\frac{1}{4}$ to 1 inch high and the ribs about $\frac{3}{8}$ to $1\frac{1}{4}$ inch high and higher than the protuberances;
    first reinforcement means in the form of a plurality of threads embedded within the sheet adjacent the splash receiving surface to resist excessive convex flexing of the sheet;
    second reinforcement means in the form of a plurality of downwardly extending threads embedded within the ribs adjacent their free edges to resist excessive convex flexing of the ribs and the surface; and
    means for attaching it to the underside of a vehicle adjacent a wheel.

* * * * *